Figure 1:
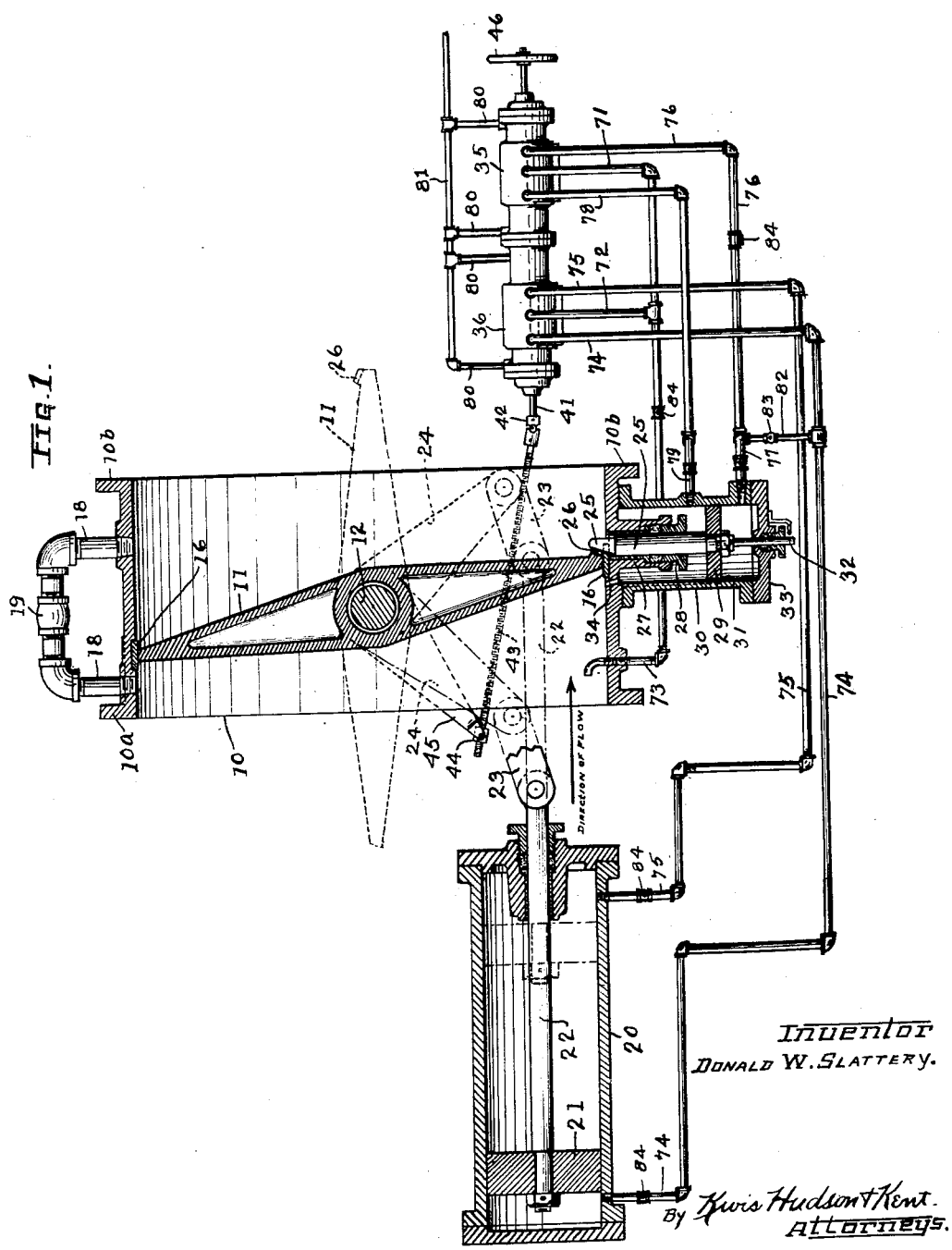

Sept. 27, 1927.  D. W. SLATTERY  1,643,753
BUTTERFLY VALVE
Filed Sept. 13, 1926  3 Sheets-Sheet 1

Inventor
Donald W. Slattery.
By Kwis Hudson & Kent.
Attorneys.

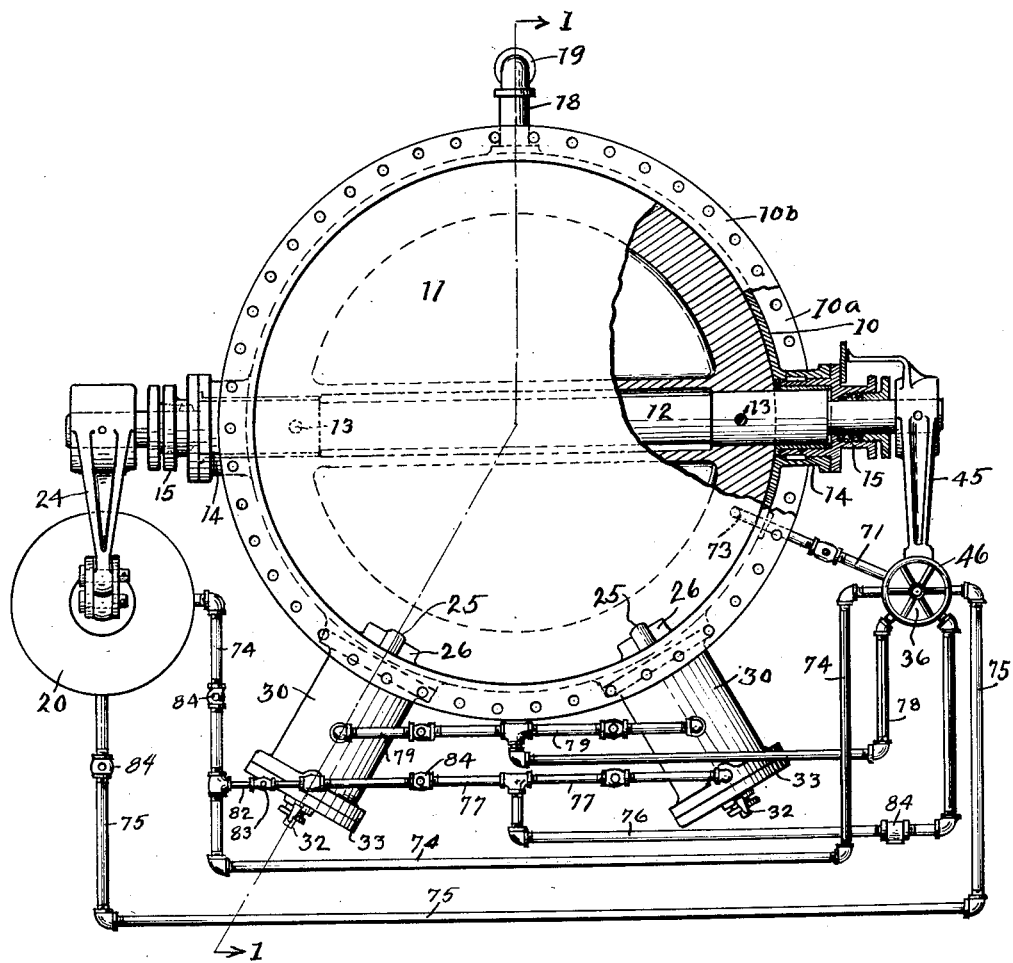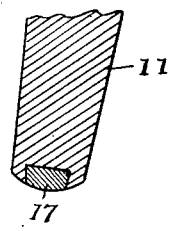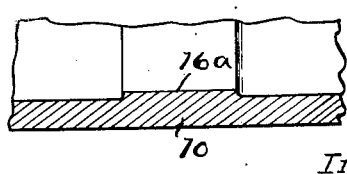

Sept. 27, 1927.
D. W. SLATTERY
BUTTERFLY VALVE
Filed Sept. 13, 1926
1,643,753
3 Sheets-Sheet 3
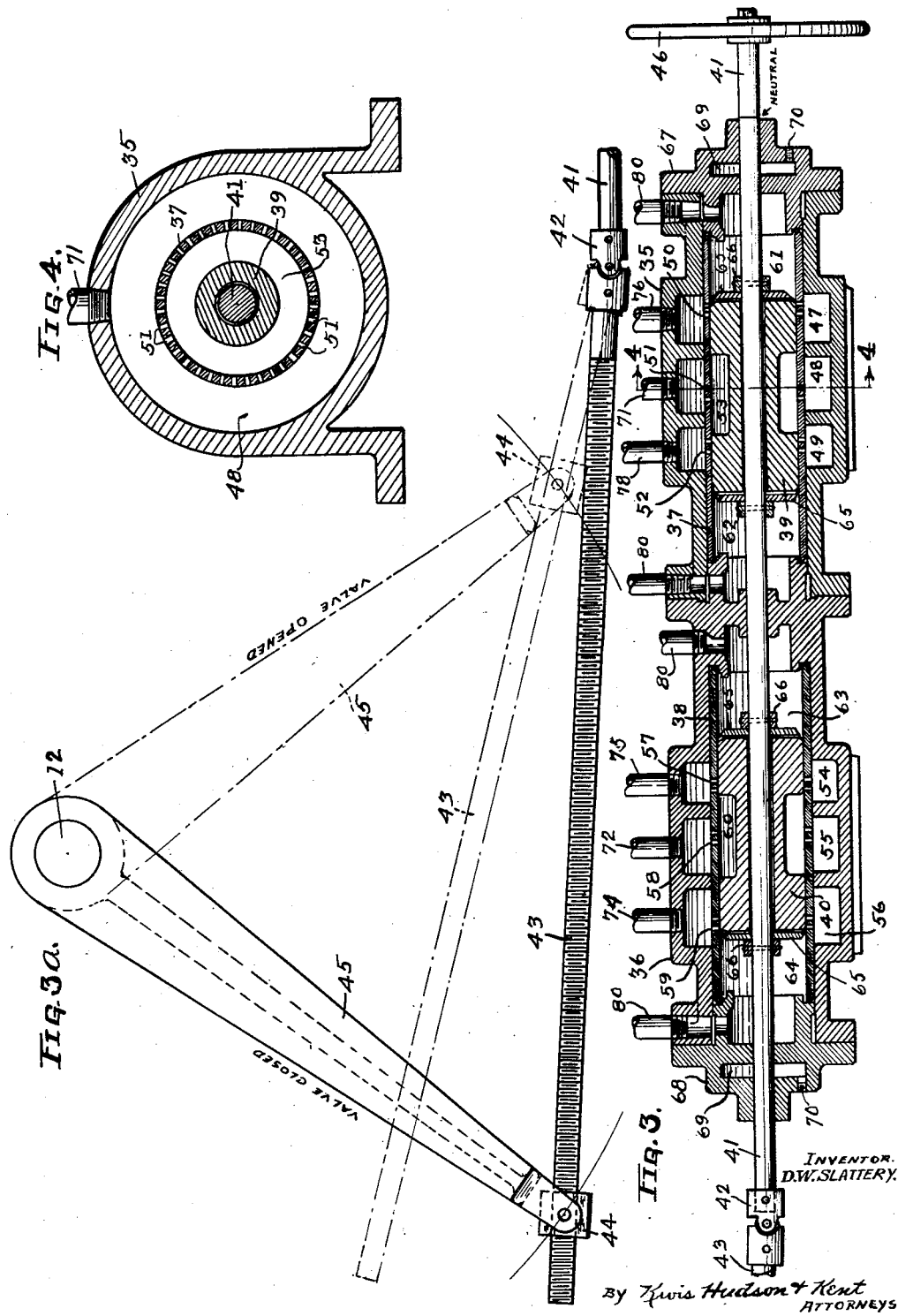
INVENTOR.
D. W. SLATTERY.
By Kwis Hudson & Kent
ATTORNEYS Patented Sept. 27, 1927.

1,643,753

UNITED STATES PATENT OFFICE.

DONALD W. SLATTERY, OF EAST CLEVELAND, OHIO.

BUTTERFLY VALVE.

Application filed September 13, 1926. Serial No. 135,068.

This invention relates to improvements in butterfly valves and has for its main object to overcome in an efficient manner the one outstanding objection to butterfly valves, that being the tendency of the pressure of the water on one-half of the valve disk to spring or move the valve from its seat causing leakage.

It is well known that when a valve of this type is closed and the disk is subjected to the full pressure in the water line, the pressure on one-half the face of the disk tends to force that portion of the valve against the seat whereas the pressure on the other half tends to force the latter away from its seat. Inasmuch as the load on the disk is generally very high the pressure acting on one-half and tending to seat the valve and the pressure on the other half tending to unseat it causing a deflection in the disk and considerable leakage. If the disk is made heavy enough to resist this deflection by its own stiffness it will be necessary to design the disk with an extremely large cross-section and this would take up a considerable portion of the valve opening causing an increase in velocity and resulting in a considerable loss of head which is a matter of considerable importance if the valve is used in power plants. Additionally the leakage water generally passes the valve and its seat at the very high velocity which in time causes erosion with the amount of leakage constantly increasing as erosion increases.

According to the present invention a butterfly valve of the wedged disk type is provided; that is to say one or more wedges are utilized and so positioned that they may be moved inwardly through the valve casing adjacent the seat of the valve and having a wedging action behind the valve so as to effectively overcome the unseating tendency by the pressure of the water on one-half of the disk as explained above.

The present invention resides in the operating and controlling means for the disk and wedge or wedges, it being a feature of the present invention that the operating means or devices for swinging the disk on its axis to and from its seat and for inserting or withdrawing the wedge or wedges are required to function in predetermined order.

Various instrumentalities may be employed for shifting the valve and the wedge or wedges and they may be operated by different kinds of power such as hydraulic, electrical or mechanical power, but it is a feature of the invention that regardless of the type of operating means employed or the kind of power utilized for this purpose a control is employed which requires on opening that the wedge or wedges first be withdrawn out of the waterway and the valve then opened, and in closing that the valve first be moved to its seat and that the wedge or wedges then be moved to wedging engagement with the back of the valve.

In the accompanying sheets of drawings I have illustrated my invention applied to a valve wherein the disk and wedge or wedges are actuated by hydraulic means and I have illustrated a control for the hydraulic operating means which accomplishes the results above stated, but it will be understood that the specific form of controlling means will depend upon the type of operating means employed and the particular means herein illustrated is illustrative of the principle of the invention capable of being varied to suit the type of operating means employed and the type or form of energy or power utilized.

In the drawings:

Fig. 1 is a sectional view through a valve embodying the invention, the section being taken substantially along the line 1—1 of Fig. 2, Fig. 2 is a view of the valve looking toward the left of Fig. 1, Fig. 3 is a sectional view through a double control valve which controls the supply of power to the operating means for the disk and wedges and insures the operation of these parts in the desired order;

Fig. 3$^a$ is a continuation of Fig. 3, showing a portion of the control mechanism forming a part of that shown in Fig. 3, Fig. 4 is a sectional view on the line 4—4 of Fig. 3, Fig. 5 is a fragmentary sectional view illustrating another way than shown in Fig. 1 for forming the valve seat on the inner surface of the valve casing, and Fig. 6 shows a slight modification in the shape of the seating portion of the valve disk.

Referring now to the drawings, the valve comprises a valve body or casing 10 having flanges 10$^a$ and 10$^b$ by which it may be secured to the adjoining portions of the water line. Inside the casing is a valve disk 11 which is carried by a centrally and transversely disposed shaft 12 to which the disk is secured as by pins 13, the shaft being supported in bearings 14 formed on diametrically opposite sides of the casing 10, packing boxes with glands being provided as illustrated at 15. As illustrated in Fig. 1 the edge of the disk is flat and it engages a suitable seat 16 provided on the inner surface of the casing 10 which seat as illustrated in Fig. 1 may be formed of suitable wear resisting material such as bronze. On the other hand, the seat may be a surface machined in the casing as illustrated at 16ª in Fig. 5. Instead of the edge of the disk being flat it may be rounded as illustrated in Fig. 6 in which event it may be provided with semi-circular seating strips 17 of a suitable soft material, such as babbitt to permit the disk to find its own seat when closed.

The casing is shown as provided with a suitable by-pass pipe 18 equipped with a valve 19, this pipe communicating with the interior of the casing on opposite sides of the seat for the disk 11.

In Fig. 1 the valve is shown in closed position and the direction of the flow of water is indicated by the arrow. It will be seen, therefore, that the pressure of the water on the upper half of the disk tends to seat the valve while the pressure on the lower half tends to unseat it.

In this instance, the valve disk is adapted to be closed and opened by power applied to a hydraulic cylinder 20 containing a piston 21 on a piston rod 22 which is connected by a link 23 in turn connected to a crank arm 24 which is secured to one end of shaft 12. As previously stated, hydraulic motor is not required for this purpose and even if employed the power may be transmitted from the piston to the shaft 12 by other means such as by rack and pinion.

For the purpose of effectively resisting the pressure of the water tending to unseat one-half of the valve, I employ one or more wedges which extend through the casing and are adapted to engage behind the outer part of disk 11 at that portion thereof which is adapted to be deflected and unseated by the pressure of the water. In this case two of these wedges 25 are employed but in some instances a single wedge will suffice, and in other cases more than two may be desirable. As illustrated these wedges are arranged on opposite sides of the vertical center plane of the valve and their inner ends which are tapered are adapted to engage seats 26 formed of good wear resisting material such as bronze and provided on the back side of the disk near its periphery. They are disposed so as to move radially so that the inner tapered portions may move into and out of the water line. When the valve is seated as illustrated in Fig. 1 these wedges or the inner tapered ends thereof are adapted to have a tight wedging action on the seats 26 on the back side of the valve as stated, so as to hold the lower part of the valve against its seat and when the wedges are withdrawn they will be clear of the valve so as not to obstruct its opening movement.

It is not essential that the wedges engage the lower part of the valve for if the valve is mounted so as to swing in the opposite direction to that illustrated, the wedges, to be effective will, of course, engage the back side of the upper portion of the disk. The essential point is that they engage behind that portion of the disk which the pressure of the water tends to unseat.

The wedges have a sliding fit in suitably lined extensions 27 of the valve casing or body 10 and packing boxes or glands 28 are provided at the outer ends of these extensions to prevent leakage. In this instance, the wedges are operated hydraulically and accordingly each is in the form of a piston rod or plunger, to the outer end of which is secured a piston 29 in a hydraulic cylinder 30 suitably secured to the valve casing 10 around the corresponding extension 27. Suitable means such as a feather key 31 is employed to keep the piston from turning. The outer end of the wedge or piston rod 25 may be provided with an indicator rod 32 extending out to the cylinder head 33 to form visible means to indicate whether the wedge is in or out.

On the pressure side of the valve when closed, a port 34 is formed through the casing 10 so as to communicate with the interior of each cylinder 30 so as to constantly maintain a pressure on the inner side of each of the wedge operating pistons and guard against the accidental inward movement of the wedge at any time when the valve disk is not engaging its seat.

Taking up next the controlling means for the valve disk and the locking wedges (See Figs. 3 and 3ª) I employ, in this instance, what may be termed a double control valve which includes two housings 35 and 36 which as here illustrated are arranged end to end and for convenience of manufacture are formed separately, the adjoining ends being preferably secured together. In these housings are secured two sleeves 37 and 38 and slidable in the sleeves are two pistons 39 and 40 secured to an endwise movable rod 41 connected by a universal coupling 42 to a screw 43 which is threaded for substantially its full length and passes through a nut 44 trunnioned in the lower end of a lever 45 secured to valve shaft 12 preferably on the opposite end to that to which the closing lever 24 is attached. The rod 41 and screw 43 are adapted to be turned to operate the control valve and accordingly the end of the rod 41 opposite the coupling 42 is provided with a hand wheel 46 though the rod may be turned by other means than by hand.

It will be observed that housing 35 is provided on the interior with three annular chambers 47, 48 and 49 and that the sleeve 37 is provided opposite these chambers 47, 48 and 49 with rows of ports or perforations 50, 51 and 52. The piston 39 is somewhat longer than the distance between the two series of ports 50 and 52 and between its ends it is provided with a reduced portion forming an annular passageway 53.

Similarly, housing 36 is provided with three annular chambers 54, 55 and 56 opposite these chambers the sleeve 38 is provided with perforations or ports 57, 58 and 59.

The piston 40 is provided between its ends with a reduced portion forming an annular passageway 60 similar to the passageway 53 in piston 39. Inside of housing 35 at opposite ends of piston 39 are two exhaust chambers 61 and 62 and inside of housing 36 at opposite ends of piston 40 are exhaust chambers 63 and 64.

Packing is provided at both ends of the pistons 39 and 40 to prevent leakage around these pistons into the exhaust chambers and in this instance the packing is kept in place by packing retainer 65 held in place by collars 66 which are pinned to rod 41. At the outer ends of the two housings 35 and 36 are heads 67 and 68 through which the rod 41 extends and the openings in the heads to accommodate the rod may be provided with suitable packing glands but I prefer to avoid the use of packing glands to reduce the friction on the rod 41 and instead I show in the heads leakage chambers 69 each having a port 70 to which is a drainage pipe may be connected.

As previously stated it is the chief object to provide a control for the disk operating means and the wedge operating means so that these parts are operated and are required to be operated in the desired order. The control valve explained above with the piping next to be referred to accomplish these results. Water under pressure is supplied to the central annular chamber 48 in housing 35 and to the central annular chamber 55 in housing 36. This is supplied by pipes 71 and 72 connected respectively to these two chambers and in turn connected to a pipe 73 leading to the water line on the intake side of the valve disk as shown in Fig. 1. This pipe 73 as shown is extended through the casing 10 and has its inner end in an upstream direction so as to take advantage of the velocity head as well as static head.

Annular chambers 54 and 56 in housing 36 are connected by pipes 74 and 75 respectively to opposite ends of the disk operating cylinder 20, pressure being supplied through pipe 74 on one side of the piston 21 to open the valve and pressure being supplied through pipe 75 on the other side of the piston to close the valve.

The annular chamber 47 in housing 35 has connected to it a pipe 76 to which are connected branches 77 leading to the outer portions of the wedge operating cylinders 30 so as to supply pressure to or exhaust pressure from the outer side of the wedge operating pistons 29. Annular chamber 49 in housing 35 has connected to it a pipe 78 to which are connected branches 79 leading to the inner portions of the wedge operating cylinders 30 so as to supply pressure to or exhaust pressure from the inner side of the wedge operating pistons 29.

The chambers 61 and 62 at opposite ends of piston 39 and the chambers 63 and 64 at opposite ends of piston 40 have exhaust or drainage pipes 80 connected thereto, these pipes being connected to a pipe 81 exhausting to the atmosphere. The ports 70 at the outer ends of the control valve housings may also be connected to this pipe 81.

Additionally there is a small pipe 82 (see Fig. 2) connecting pipe 74 leading to the outer end of disk operating cylinder 20 to one of the pipes 77 which are connected to the outer ends of wedge operating cylinders 30. This pipe 82 is smaller than the pipes leading to the disk and wedge operating cylinders and has substantially the capacity of the ports 34 extending through the valve casing to the inner ends of the wedge operating cylinders, the function of these ports 34 and of the pipe 82 will be explained presently but it should be understood at this point that the pressure supplied through these ports 34 and pipe 82 is not sufficient to affect the proper operation of the pressure supplying pipes utilized in operating the valve disk and wedges.

The operation is as follows:

As shown in the drawings, the control valve is in neutral position, the butterfly valve is closed and the wedges are in locking engagement therewith. To open the valve the operator turns the hand wheel 46 to move the rod 41 with the pistons 39 and 40 and the screw 43 to the left as the same are viewed in Fig. 3. As the parts are moved in this direction the screw 43 is threaded through nut 44 which for the time being remains stationary. It will be observed that shortly after the movement is initiated the ports 50 and ports 52 in sleeve 37 are uncovered by piston 39 so as to place annular chamber 47 in communication with the exhaust chamber 61 and to place pressure chamber 51 in communication with annular chamber 49 by way of the passageway 53 of piston 39. The effect of this is to simultaneously exhaust pressure from the outer ends of the wedge operating cylinders and to supply pressure to the inner ends of these cylinders causing the wedges to be withdrawn from holding engagement with the disk 11 and in fact from the waterway.

As the turning of the hand wheel is continued ports 57 and 59 of sleeve 38 in housing 36 are next uncovered placing annular chamber 54 in communication with the exhaust chamber 63 and at the same time placing annular pressure chamber 55 in communication with annular chamber 56 through passageway 60 of piston 40. This introduces pressure at the outer end of disk operating cylinder 20 and exhausts pressure from the inner end of the cylinder whereupon the disk starts to open.

When the valve is in closed position lever 45 carrying the nut 44 through which screw 43 passes is in the position shown by full lines in Fig. 3ª and as the valve disk is moving from closed position to full open position this lever moves from the full line position shown to the dotted line position. When this lever moves from its full line position to the dotted line position it, of course, carries the nut 44 to the right as the same is viewed in Fig. 3ª and the effect of this is to move the screw 43, rod 41 and pistons 40 and 39 to the right and accordingly the opening movement of the valve disk would be stopped unless the operator continues to turn the hand wheel in the same direction as before. Therefore, in order that the valve disk may move to its full open position the operator will continue to turn the hand wheel fast enough to overcome the tendency of the nut 44 to move the screw to the right. In other words, he continues to move the hand wheel so that the pistons of the control valve will not be moved back by the nut 44 until the disk valve reaches full open position when the travel of the nut stops. The operator will then turn the hand wheel in the reverse direction until the control valve is again in neutral position. The valve now remains in full open position and the wedges remain in retracted position, the wedges being held in retracted position by the pressure supplied through ports 34 as well as by gravity.

In closing the valve the operator turns the hand wheel in the opposite direction, the effect of this being to move the pistons 40 and 39 to the right as viewed in Fig. 3, and shortly after the movement to the right is started annular chamber 56 in housing 36 is placed in communication with exhaust chamber 64 through ports 59 and simultaneously annular pressure chamber 55 is placed in communication with annular chamber 54 through ports 57 and by way of passageway 60 of piston 40. This exhausts pressure from the rear or outer end of disk operating cylinder 20 supplies pressure to the forward or inner end thereof causing the valve disk to move towards closed position. The operator continues to turn the hand wheel all the time that the valve disk is moving to closed position to counteract the tendency of the traveling nut 44 to move the screw to the left and when the valve reaches its seat and the travel of the nut 44 ceases, continued movement of the hand wheel in the same direction places annular chamber 49 in housing 35 in communication with exhaust chamber 62 and at the same time places annular pressure chamber 48 in communication with annular chamber 47. This introduces pressure on the outer side of the wedge operating pistons and exhausts it from the inner side causing the wedges to be moved inwardly to holding or locking engagement with the valve disk 11. It is to be understood that while the disk was being closed no pressure could be supplied to the wedge operating cylinders to move the wedges inwardly, these wedges being held in retracted position until the complete closure of the valve and then being moved inwardly as stated above.

As soon as the wedges are moved inwardly to holding or locking position the operator reverses the rotation of the hand wheel so as to restore the control valve to neutral position whereupon the parts remain and are held as shown in Fig. 1.

By the provision of the small pipe 82, which, as explained above, connects pipe 74 leading to the outer end of the disk operating cylinder with one of the pipes 77 leading to the outer ends of the wedge operating cylinders, pressure is exhausted from the outer ends of the wedge operating cylinders through this pipe 82 into pipe 74 during the entire period that the valve disk is being closed for, during the closing movement of the valve disk, pressure is supplied to the inner end of the disk operating cylinder and exhausted from the outer end which also insures the exhausting of outer end of wedge operating cylinder through pipe 82 and pipe 74. When pressure is supplied through pipe 74 to the outer end of the disk operating cylinder to open the valve, no pressure would be supplied through pipe 82 to the outer ends of the wedge operating cylinders, because the check valve would close.

If desired, stop cocks 84 may be provided in each of the different pipes extending between the control valve and the disk and wedge operating cylinders, and similar cocks may be provided in the pressure supplying pipes 71, 72 and 73.

I have not attempted in the drawings to illustrate the relative sizes of the pipes which may be employed in practice in conveying pressure to and exhausting it from opposite ends of the disk and wedge operating cylinders, but, generally, the pipes connected to opposite ends of the disk operating cylinder will be larger than the pipes connected to opposite ends of the wedge operating cylinders.

It will be seen from the above that I have provided a butterfly valve with one or more holding wedges for holding against the seat that portion of the valve which the pressure of the water tends to unseat, and that I have provided additionally operating means for the valve disk and wedge or wedges with actuating or controlling means for the operating means so constructed and designed as to cause the disk and wedges to be operated in the proper sequence or order at the same time, making it impossible for them to be operated in the incorrect order. Furthermore it is impossible for the wedges to be moved inwardly into the waterway until the valve disk reaches its seat thus avoiding likelihood of injury to the valve disk as might occur if the time of operation of one part relative to another should be within the discretion of or be left to the judgment of the operator, as for example, if separate controls were provided with the ever prevailing possibility and probability of mistakes in times of operation due to carelessness or ignorance.

The above features I regard within the scope of the present invention without intending to limit myself to the specific means herein disclosed or to hydraulic operation.

It might be stated further that in the drawings I have shown the parts, particularly the piping and ports to which the piping is connected more or less conventionally and in Fig. 3 the pipe connections illustrated are all made at the upper part of the housings for the sake of clearness, where as they are not so shown in Fig. 2. It will be understood in practice the piping will be arranged and connected as will be found advisable or convenient. Furthermore, while the parts of the double control valve are herein illustrated as being arranged end to end I do not regard this as necessary arrangement as they could be arranged side by side without sacrificing any material advantages.

Having thus described my invention, I claim:

1. In a butterfly valve, a valve casing, a disk pivotally supported in the casing, a holding device adapted to engage the disk to resist the unseating tendency of the pressure on one-half the disk, means for turning the disk to open and close the valve, means for actuating the holding device, and means for insuring the actuation of the disk and holding device in predetermined order.

2. In a butterfly valve, a valve casing, a disk adapted to be swung on a transverse axis to open and close the valve, a holding device for engaging the disk to overcome the unseating action of the pressure on one-half the disk, means for shifting the disk, means for shifting said holding device, and a single controlling device for both of said means.

3. In a butterfly valve, a valve casing, a movable valve member comprising a disk mounted to swing about a transverse axis, a holding device for engaging the disk to overcome the unseating tendency of the pressure on one-half the disk, motors for turning the disk and for withdrawing and inserting the holding device, and a single control for both motors.

4. In a butterfly valve, a valve casing, a movable valve member comprising a disk mounted to swing about a transverse axis, a holding device for engaging the disk to overcome the unseating tendency of the pressure on one-half the disk, motors for turning the disk and for withdrawing and inserting the holding device, and controlling means for said motors for causing the holding means to be withdrawn before the disk is turned in opening the valve and for causing the disk to be swung to its seat before the holding means is inserted in the water line.

5. In a butterfly valve, a valve casing, a movable valve member comprising a disk mounted to swing about a transverse axis, a holding device for engaging the disk to overcome the unseating tendency of the pressure on one-half the disk, motors for turning the disk and for withdrawing and inserting the holding device, and controlling means for supplying power to said motors in predetermined order.

6. In a butterfly valve, a valve casing, a movable valve member comprising a disk mounted to swing about a transverse axis, a holding device for engaging the disk to overcome the unseating tendency of the pressure on one-half the disk, motors for turning the disk and for withdrawing and inserting the holding device, and unitary controlling means which in opening causes power to be supplied first to the motor for actuating the holding device and then to the motor for turning the disk, and in closing causes power to be supplied in the reverse order.

7. In a butterfly valve, a valve casing, a movable valve member comprising a disk mounted to swing about a transverse axis, a holding device for engaging the disk to overcome the unseating tendency of the pressure on one-half the disk, motors for turning the disk and for withdrawing and inserting the holding device, and controlling means for causing power to be supplied to the motors in a predetermined order in opening and in predetermined order in closing, and means for preventing the supply of power to the motor for actuating the holding device until the disk has reached its seat in the closing operation.

8. In a butterfly valve, a valve casing, a valve disk therein pivoted to turn about a transverse axis, a holding wedge adapted to be withdrawn from and inserted in the water line so as to engage the back of the disk and overcome the unseating tendency of the pressure on the disk, hydraulic means for turning the valve and actuating the wedge, and a control for said hydraulic means which insures the supply of pressure to said motors in predetermined order.

9. In a butterfly valve, a valve casing, a valve disk therein pivoted to turn about a transverse axis, a holding wedge adapted to be withdrawn from and inserted in the water line so as to engage the back of the disk and overcome the unseating tendency of the pressure on the disk, hydraulic means for turning the valve and actuating the wedge, and valve means for controlling the supply of pressure to said motors in predetermined order.

10. In a butterfly valve, a valve casing, a valve disk therein pivoted to turn about a transverse axis, a holding wedge adapted to be withdrawn from and inserted in the water line so as to engage the back of the disk and overcome the unseating tendency of the pressure on the disk, hydraulic motors for turning the valve and actuating the wedge, and a double control valve for said motors operable from a single point for causing pressure to be supplied in opening first to the wedge operating motor and then to the disk operating motor, and in the reverse order in closing.

11. In a butterfly valve, a valve casing, a valve disk therein pivoted to turn about a transverse axis, a holding wedge adapted to be withdrawn from and inserted in the water line so as to engage the back of the disk and overcome the unseating tendency of the pressure on the disk, hydraulic motors for turning the valve and actuating the wedge, a double control valve for said motors operable from a single point for causing pressure to be supplied in opening first to the wedge operating motor and then to the disk operating motor, and in the reverse order in closing, and a connection between the disk and the valve whereby a continuous opening or closing movement of the valve is contingent upon continued movement of the valve.

In testimony whereof, I hereunto affix my signature.

DONALD W. SLATTERY.